US009261745B2

(12) United States Patent
Cheng et al.

(10) Patent No.: US 9,261,745 B2
(45) Date of Patent: Feb. 16, 2016

(54) FAST RESPONSE OPTICAL DEVICES BY DOUBLE LIQUID CRYSTAL CELLS STRUCTURE

(71) Applicants: Hsienhui Cheng, Kent, OH (US); Achintya Bhowmik, Santa Clara, CA (US); Philip J. Bos, Hudson, OH (US)

(72) Inventors: Hsienhui Cheng, Kent, OH (US); Achintya Bhowmik, Santa Clara, CA (US); Philip J. Bos, Hudson, OH (US)

(73) Assignee: Kent State University, Kent, OH (US)

( * ) Notice: Subject to any disclaimer, the term of this patent is extended or adjusted under 35 U.S.C. 154(b) by 451 days.

(21) Appl. No.: 13/892,895

(22) Filed: May 13, 2013

(65) Prior Publication Data

US 2014/0333875 A1 Nov. 13, 2014

(51) Int. Cl.
*G02F 1/1335* (2006.01)
*G02F 1/1347* (2006.01)
*G02F 1/13363* (2006.01)

(52) U.S. Cl.
CPC ........ *G02F 1/13471* (2013.01); *G02F 1/13363* (2013.01)

(58) Field of Classification Search
CPC .................................................. G02F 1/13471
USPC ................................. 349/18, 74, 96
See application file for complete search history.

(56) References Cited

U.S. PATENT DOCUMENTS

| 6,067,142 | A | 5/2000 | Anderson et al. | |
|---|---|---|---|---|
| 2003/0218709 | A1* | 11/2003 | Ito | G02B 5/3083 349/117 |
| 2006/0038929 | A1* | 2/2006 | Wang | G01J 3/26 349/18 |

FOREIGN PATENT DOCUMENTS

GB 2196751 * 5/1988

OTHER PUBLICATIONS

Jang, et al., "Optimization of the White State Director Configuration for Perfectly Compensated Pi-cell Devices," Japanese Journal of Applied Physics, vol. 46, No. 9A, pp. 5821-5828 (2007).
Wang, et al., "Finite-difference time-domain simulation of a liquid crystal optical phased array," J. Opt. Soc. Am. A, vol. 22, No. 2, pp. 346-354 (2005).
Mori, et al., "Optical Performance of the π Cell Compensated with a Negative-Birefringence Film and an A-plate," Japanese Journal of Applied Physics, vol. 38, No. 5A, pp. 2837-2844 (1999).
Yeung, et al., "Pi-cell crystal displays at arbitrary pretilt angles," Applied Physics Letters 88, pp. 041108-1-041108-3 (2006).

(Continued)

*Primary Examiner* — Hoan C Nguyen
(74) *Attorney, Agent, or Firm* — Fay Sharpe LLP

(57) ABSTRACT

A phase retarder comprises first and second π-cells or other tunable birefringent devices arranged optically in series. The phase retardation value of the phase retarder is a difference between the phase retardation values of the first and second π-cells. Driving circuitry drives the phase retarder to generate a target phase retardation value by: (1) prior to a relaxation period, biasing the π-cells to produce the target phase retardation value; (2) during the relaxation period, biasing the first π-cell at a constant bias value; and (3) during the relaxation period, lowering the bias value of the second π-cell continuously or stepwise to maintain the target phase retardation value for the phase retarder throughout the relaxation period. In some embodiments the operation (2) comprises applying zero bias to the first π-cell throughout the relaxation period. In some embodiments the operation (1) comprises applying a maximum operational bias to the second π-cell.

20 Claims, 11 Drawing Sheets

(56) References Cited

OTHER PUBLICATIONS

Sze-Yan, et al., "Fast-response no-bias-bend liquid crystal displays using nanostructured surfaces," Applied Physics Letters 88, pp. 063505-1-063505-3 (2006).

Kim et al., "Stabilization of the liquid crystal director in the patterned vertical alignment mode through formation of pretilt angle by reactive mesogen," Applied Physics Letters 90, pp. 261910-1-261910-3 (2007).

Yang, et al., "Cholesteric liquid crystal/polymer dispersion for haze-free light shutters," Applied Physics Letters 60 (25), pp. 3102-3104 (1992).

Yeung, et al., "Variable crystal pretilt angles by nanostructured surfaces," Applied Physics Letters 88, pp. 051910-1-051910-3 (2006).

Haven, "A liquid-crystal video stereoscope with high extinction ratios, a 28% transmission state, and one-hundred-microsecond switching," SPIE True 3D Imaging Techniques and Display Technologies, vol. 761 pp. 23-26 (1987).

Xu, et al., "P-137: Photoaligned Transflective Liquid Crystal Display with Single Cell Gap using OCB and Low Twist Nematic Modes," SID Symposium Digest of Technical Papers. vol. 38. No. 1, pp. 717-720 (2007).

* cited by examiner

FAST RESPONSE OPTICAL DEVICES BY DOUBLE LIQUID CRYSTAL CELLS STRUCTURE

BACKGROUND

The following relates to the optoelectronic, electro-optical, display, light-switching, light phase modulation, and related arts.

Fast-response optical devices are of value in applications such as field-sequential display technologies, three-dimensional display technologies, and for various non-display technologies such as high-speed fiber optical communication systems. For such applications, high-speed optical devices such as variable phase retarders, multi-level (i.e. "gray scale") attenuators, and optical shutters are of interest.

An optical shutter with high switching speed is described in Haven, "A liquid-crystal video stereoscope with high extinction ratios, a 28% transmission state, and one-hundred-microsecond switching", in Proc. SPIE True 3D Imaging Techniques and Display Technologies vol. 761 pages 23-26 (1987). This device overcomes a typical problem with liquid crystal-based switching devices, namely that the transition created by applying voltage is much faster (of order tenths of a millisecond) than the transition created when the voltage is removed (relaxation, of order several milliseconds). The approach of Haven employs a pair of π-cells (see, e.g. Bos et al., Mol. Cryst. Liq. Cryst. Vol. 113, page 329 (1984)) whose rubbing directions are oriented orthogonally, sandwiched between fixed polarizer and analyzer elements. The total phase retardation is the difference between the phase retardations of the two constituent π-cells, and fast switching is achieved by relaxing both π-cells together to generate a zero phase shift and switching and holding voltage on only one π-cell to generate a phase shift of π (180°). When the two π-cells are relaxed together, the relaxation-versus-time curve is the same for both π-cells leading to zero total phase shift throughout the relaxation time.

The device of Haven is an optical shutter, and does not provide gray scale levels and is not useful in color display devices.

BRIEF SUMMARY

In some illustrative embodiments disclosed herein, a phase retarder comprises a first tunable birefringent device and a second tunable birefringent device arranged optically in series. Each of the first tunable birefringent device and the second tunable birefringent device has a maximum-bias phase retardation $\phi_{max\_drive}$ at steady state for a maximum bias value and a relaxed phase retardation $\phi_{relaxed}$ at steady state for a minimum bias value. Driving circuitry is configured to drive the phase retarder to generate a target phase retardation $\phi_{target}$ for the phase retarder over the relaxation period of a time frame comprising a transition period followed by a relaxation period by operations including: (1) biasing the second tunable birefringent device at the maximum bias value during the transition period yielding the maximum-bias phase retardation $\phi_{max\_drive}$ for the second tunable birefringent device at the beginning of the relaxation period; (2) biasing the first tunable birefringent device during the transition period at a bias value determined based on the target phase retardation $\Phi_{target}$; (3) biasing the first tunable birefringent device at the minimum bias value during the relaxation period yielding the relaxed phase retardation $\phi_{relaxed}$ for the first tunable birefringent device at the end of the relaxation period; and biasing the second tunable birefringent device during the relaxation period at a bias value determined based on the target phase retardation $\phi_{target}$. The driving circuitry is configured to perform the biasing operations (2) and (4) at bias values between the minimum bias value and the maximum bias value. In some embodiments the minimum bias value is zero volts. In some embodiments the first tunable birefringent device is a first π-cell and the second tunable birefringent device is a second π-cell having its rubbing directions oriented tranverse to the rubbing directions of the first π-cell. In some embodiments the biasing operation (4) is configured to maintain $\phi_A(t)-\phi_B(t)=\phi_{target}$ throughout the relaxation period where t denotes time, $\phi_A(t)$ is the phase retardation of the first tunable birefringent device over the relaxation period, and $\phi_B(t)$ is the phase retardation of the second tunable birefringent device over the relaxation period. In some embodiments a first polarizer and a second polarizer are disposed on opposite sides of the phase retarder.

In some illustrative embodiments disclosed herein, a display device comprises an array of light-transmissive pixels and a backlight illuminating the array of light-transmissive pixels. Each light transmissive pixel includes a light-transmissive optical element comprising a liquid crystal material, an entrance color filter disposed on the side of the light-transmissive optical element receiving light from the backlight, and an exit color filter of the same color as the entrance color filter disposed on the opposite side of the light-transmissive optical element from the entrance color filter. In some embodiments the entrance and exit color filters of neighboring pixels of the array of light-transmissive pixels are of different colors. In some embodiments the light-transmissive optical element comprises a phase retarder including a first tunable birefringent device and a second tunable birefringent device arranged optically in series, and driving circuitry configured to drive the phase retarder to generate at least three different gray scale levels.

In some illustrative embodiments disclosed herein, a phase retarder comprises a first tunable birefringent device and a second tunable birefringent device arranged optically in series. The phase retardation value of the phase retarder is a difference between the phase retardation value of the first birefringent device and the phase retardation value of the second tunable birefringent device. Driving circuitry is configured to drive the phase retarder to generate a target phase retardation value by operations including: (1) prior to a relaxation period, biasing the first and second tunable birefringent devices to produce the target phase retardation value for the phase retarder; (2) during the relaxation period, biasing the first tunable birefringent device at a constant bias value; and (3) during the relaxation period, lowering the bias value of the second tunable birefringent device continuously or stepwise to maintain the target phase retardation value for the phase retarder throughout the relaxation period. In some embodiments the operation (2) comprises applying zero bias to the first tunable birefringent device throughout the relaxation period. In some embodiments the operation (1) comprises applying a maximum operational bias to the second tunable birefringent device. In some embodiments the first tunable birefringent device comprises a first π-cell and the second tunable birefringent device comprises a second π-cell.

DETAILED DESCRIPTION

Disclosed herein are optical phase retarders and gray scale attenuators having fast switching times, constructed based on a pair of π-cells or other paired tunable birefringent devices. Unlike the optical shutter of Haven whose paired π-cells provide either 0° or 180° phase shift corresponding to "on" or "off" light transmission (i.e. an optical shutter), the disclosed devices are capable of providing arbitrary phase shift corresponding to light transmission levels between fully "on" and fully "off" (i.e., gray scale levels). The disclosed gray scale attenuators are useful in display applications, including color display applications. For color displays, a further improvement disclosed herein provides reduced color cross-talk between neighboring pixels of different colors.

Figure 1:
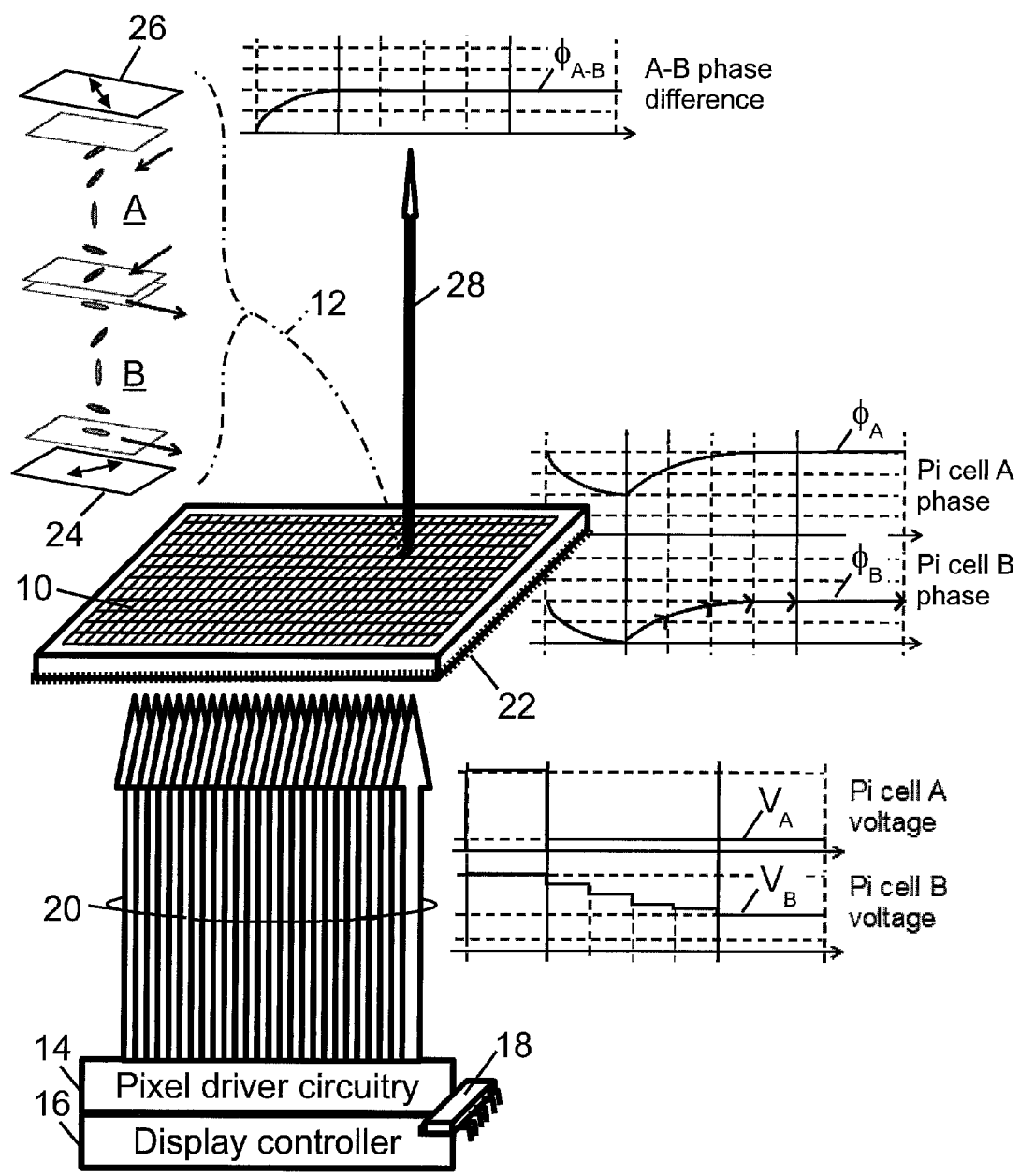
FIG. 1 diagrammatically shows a display device with selected voltage and phase retardation versus time curves superimposed, along with a diagrammatic representation of an illustrative pixel shown in the upper left.

With reference to FIG. 1, a display comprises an array of pixels 10, one of which is diagrammatically shown in the inset 12 at upper-left, driven by pixel driver circuitry 14 controlled by a display controller 16. The pixel driver circuitry 14 and display controller 16 are embodied by suitable electronics, such as a diagrammatically illustrated discrete integrated circuit (IC) chip 18 (or a combination of IC circuits, e.g. a microprocessor and read-only memory (optionally erasable) containing programming executed on the microprocessor. The IC chip(s) are optionally mounted on a backside of a circuit board supporting the pixel array 10, or may be constructed as electronics partly or wholly monolithically integrated with the pixel array 10, e.g. including thin-film transistor (TFT) driver elements. The electronics 14, 16 may be variously distributed—for example, the pixel driver circuitry 14 may be integrated on the backside of the substrate supporting the pixel array 10, while the display controller 16 may be a separate element. The display controller 16 is programmed to generate signals indicating the gray scale values for the pixels, for example so as to generate a raster display, field-sequential display, three-dimensional (3D) display, or so forth. The pixel driver circuitry 14 receives these control signals from the display controller 16 and generates a (generally time-varying) drive voltage 20 for each pixel 12 of the array 10. (In FIG. 1 these voltages 20 are diagrammatically indicated by block arrows directed from the pixel driver circuitry 14 to the pixel array 10.) For example, the drive voltages 20 may be generated using digital-to-analog (D/A) converters. Not illustrated in FIG. 1 are "upstream" electronics such as television receiver circuitry, computer display circuitry, or so forth that generate and transmit the display pattern to the display controller 16 for rendering on the pixel array 10.

A backlight, such as a diagrammatically illustrated (LED)-based backlight 22 integrated into the pixel array 10, generates illumination that is modulated by the pixel array 10. In other embodiments, the backlight is suitably an incandescent, fluorescent, or halogen backlight lamp which may be integrated with or separate from the pixel array 10.

The illustrative pixel 12 is constructed as a pair of π-cells A, B arranged optically in series (that is, so that light transmits through both π-cells A, B in sequence (or reverse sequence, i.e. the order of cells A and B in the optical series can be reversed) with orthogonal alignment layer rubbing directions for the π-cells A, B, sandwiched between crossed polarizers 24, 26. The crossed polarizers 24, 26 are tilted 45° respective to the "x-y" orientations of the rubbing directions of the π-cells A, B. This arrangement of optical elements is similar to the arrangement of optical elements in the optical shutter of Haven, "A liquid-crystal video stereoscope with high extinction ratios, a 28% transmission state, and one-hundred-microsecond switching", in Proc. SPIE True 3D Imaging Techniques and Display Technologies vol. 761 pages 23-26 (1987). However, the control of the two π-cells A, B by the pixel driver circuitry 14 is different, as disclosed herein. More generally, other paired tunable birefringent devices can be employed in place of the π-cells A, B. In general, the two tunable birefringent devices (e.g. the illustrative π-cells A, B) are arranged optically in series to form the phase retarder. By arranging the relaxed polarization directions of the two tunable birefringent devices oriented orthogonal to each other as illustrated in FIG. 1 (or alternatively oriented parallel with each other), the achievable phase retardation range is maximized for the phase retarder. Moreover, while the illustrative phase retarder in combination with the crossed polarizers 24, 26 is pixel 12 of pixel array 10, the phase retarder may instead be a component of an optical source used in an optical fiber system or so forth.

Figure 2:
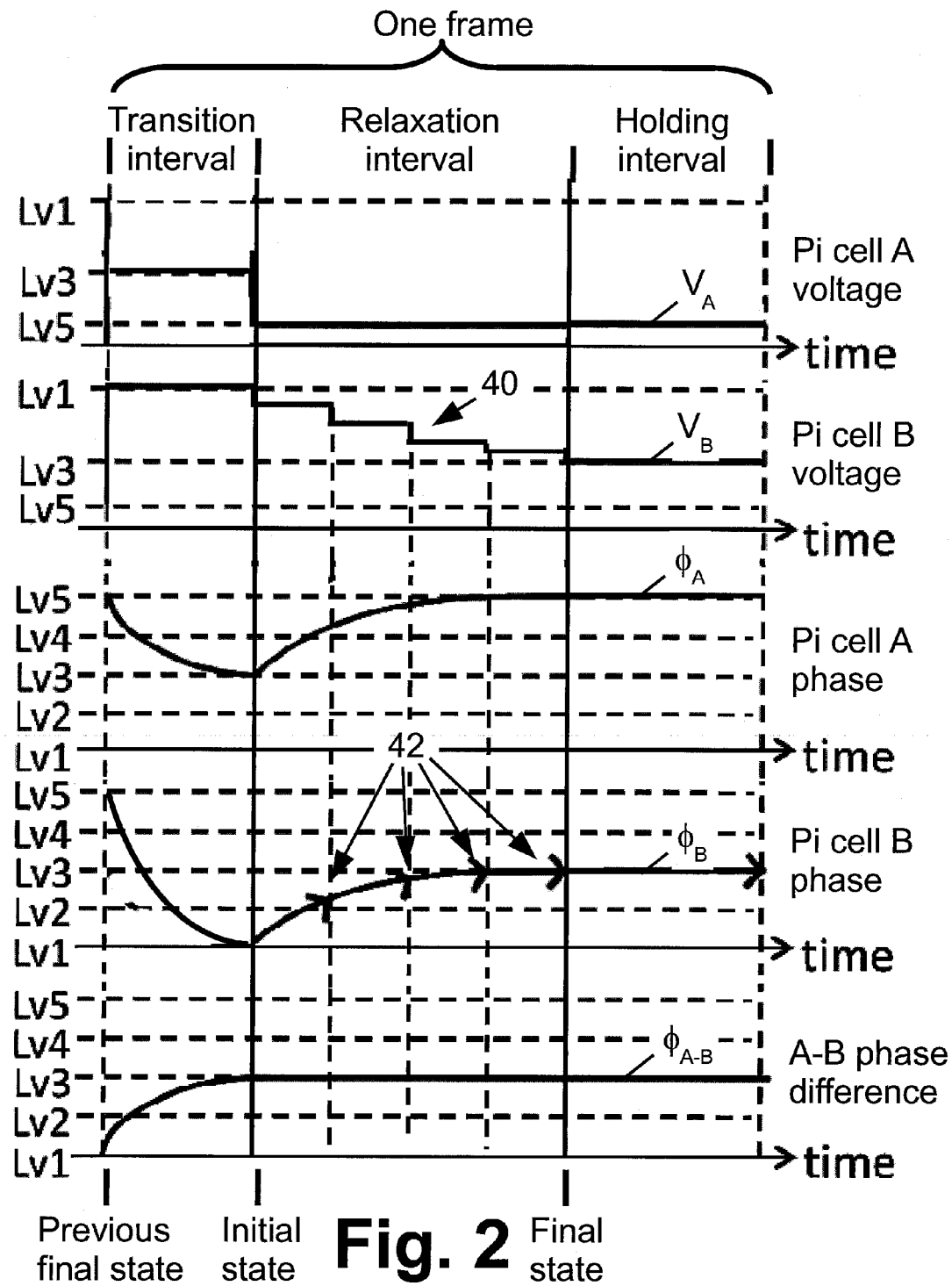
FIG. 2 diagrammatically shows expanded views of the voltage and phase versus time waveforms of FIG. 1.

With continuing reference to FIG. 1 and with further reference to FIG. 2, the pixel driver circuitry 14 generates a time-varying voltage $V_A$ operating π-cell A to produce a time-varying phase shift $\phi_A$ for π-cell A, and a time-varying voltage $V_B$ operating π-cell B to produce a time-varying phase shift $\phi_B$ for π-cell B. (Note that the voltages $V_A$, $V_B$ are illustrative samples of the set of operating voltages 20 conveyed from the pixel driver circuitry 14 to the pixel array 10.) The total phase shift experienced by light 28 (diagrammatically represented by a block arrow) transmitted through the pair of π-cells A, B of the pixel 12 is given by the difference $\phi_{A-B}$ between phase shift $\phi_A$ of π-cell A and phase shift $\phi_B$ of π-cell B.

With particular reference to FIG. 2, the voltages and phase shifts are plotted for one operational frame, where the frame includes a transition occurring over a "transition time" during which voltage is applied to one or both π-cells A, B to drive the cell(s) away from the relaxed state, followed by a "relaxation time" during which the applied voltage is removed or reduced so that the π-cell(s) relax back toward the unbiased state, and an optional "holding time" following the relaxation time during which the π-cells A, B are maintained in their current state. It should be noted that the time axis of FIG. 2 is not to scale, and typically the transition time interval is of order a tenth of a millisecond while the relaxation time interval is of order several milliseconds. Because of this large difference in interval lengths, the optical transmission is determined almost entirely by the relaxation time interval (and any holding time interval).

The transition time is the switching time between different levels. An "active time" is defined as the time that the retardation level is constant, and equals the sum of the relaxation time and the holding time (if any). The states of liquid crystal π-cells in the beginning and end of the active time are called initial state and final state. In the disclosed phase retardation device driving approach, the liquid crystal director field relaxes during the active time, so the active time should be longer than the cell relaxation time. The transition time is limited by the response time of the liquid crystal cell when a voltage is applied (which is fast for typical π-cells, e.g. of order a fraction of a millisecond), and the active time (relaxation time plus any holding time) is limited by the response time of the liquid crystal cell when an applied voltage is removed (which is longer, e.g. of order several milliseconds).

In illustrative examples presented herein (e.g. FIG. 2), an attenuator design with five gray levels denoted Lv1, Lv2, Lv3, Lv4, and Lv5 is described. On phase plots, these denotations Lv1 . . . Lv5 indicate the phase shift for a given gray level (in other words, a discrete value for phase shift $\phi_A$ for π-cell A, or a discrete value for phase shift $\phi_B$ for π-cell B, or the total phase shift of the combination of π-cells A, B for the $\phi_{A-B}$ plot. In the voltage plots, these denotations Lv1 . . . Lv5 indicate the applied voltage which settles the π-cell at the corresponding gray level. The leve' state (Lv1) denotes the lowest phase retardation (achieved by applying the highest voltage for a given π-cell, in some embodiments Lv1=0 volts), and level5 (Lv5) state is the state with the highest phase retardation (achieved by applying the lowest voltage for a given π-cell, in some embodiments zero volts yields Lv5).

In the illustrative phase retardation device driving approach, voltage applied during the transition interval is used to change the state(s) of π-cell(s) from the final state of previous frame to the initial state of current frame. The initial phase values are denoted $\phi_A^i$ for π-cell A and $\phi_B^i$ for π-cell B. During the relaxation interval the π-cells are allowed to relax back to a final state $\phi_A^f$ for π-cell A and $\phi_B^f$ for π-cell B. To assure that the full range of total phase shift $\phi_{A-B}$ is achievable in any frame, π-cell A is always allowed to relax to the highest phase retardation state ($\phi_A^f$=Lv5 in the examples) by the end of the relaxation interval of each frame. The π-cell B is allowed to relax back to the phase retardation such that $\phi_A^f - \phi_B^f$=Lv5−$\phi_B^i$ equals the desired total phase retardation at the end of the frame. Additionally, to ensure π-cell B is able to compensate π-cell A over the relaxation interval, π-cell B is driven to its lowest retardation value at the beginning of each active time interval, that is, $\phi_B^i$=Lv1.

These constraints are expressed in Equations (1) and (2), where the superscript i designates the initial state and superscript f designates the final state (see FIG. 2).

$$\phi_B^i = Lv1 \tag{1}$$

$$\phi_A^f = Lv5 \tag{2}$$

The target (total) phase retardation of the frame is denoted $\phi_{target}$. Since the total phase retardation $\phi_{A-B}$ is the difference between the phase retardation of π-cell A and the phase retardation of π-cell B, the target phase retardation imposes the further constraint:

$$\phi_A(t) - \phi_B(t) = \phi_{target} \text{ for all } t \text{ in relaxation interval} \tag{3}$$

where in Equation (3) the time (t) dependence is explicitly indicated. At the initial state, Equations (1) and (3) yield $\phi_A^i - Lv1 = \phi_{target}$ which solving for the phase shift of π-cell A at the initial state yields:

$$\phi_A^i = Lv1 + \phi_{target} \tag{4}$$

Similarly, at the final state Equations (2) and (3) yield Lv5− $\phi_B^f = \phi_{target}$ which solving for the phase shift of π-cell A at the final state yields:

$$\phi_B^f = Lv5 - \phi_{target} \tag{5}$$

With continuing reference to FIG. 2, in an illustrative example the phase retardation levels Lv1, Lv2, Lv3, Lv4, Lv5 are evenly spaced by fixed intervals $\Delta\phi$, that is, Lv2=Lv1+$\Delta\phi$, Lv3=Lv2+$\Delta\phi$, Lv4=Lv3+$\Delta\phi$, and Lv5=Lv4+$\Delta\phi$. To simplify notation it will be assumed for this example that Lv1=0 (generalization to non-zero lowest phase shift values is trivial). Thus, for this example:

$$Lv1 = 0$$

$$Lv2 = \Delta\phi$$

$$Lv3 = 2\Delta\phi$$

$$Lv4 = 3\Delta\phi$$

$$Lv5 = 4\Delta\phi \tag{6}$$

In illustrative FIG. 2, the target phase retardation is $\phi_{target}$=Lv3, so from Equations (1), (2), (4)-(6) the initial and final values for the individual π-cells A, B are computed as:

$$\phi_A^i = Lv1 + \phi_{target} = 0 + 2\Delta\phi = 2\Delta\phi = Lv3$$

$$\phi_B^i = Lv1 \tag{7}$$

$$\phi_A^f = Lv5$$

$$\phi_B^f = Lv5 - \phi_{target} = 4\Delta\phi - 2\Delta\phi = 2\Delta\phi = Lv3 \tag{7}$$

As seen in FIG. 2, and in accord with Equations (7), π-cell A relaxes over the relaxation interval from $\phi_A^i$=Lv3 to $\phi_A^f$=Lv5, while π-cell B relaxes over the relaxation interval from $\phi_B^i$=Lv1 to $\phi_B^f$=Lv3.

Generalization to more (or fewer) gray levels, and/or to a non-zero value for Lv1, is trivial. The generalization of Equation (2) is that π-cell A (more generally, the tunable birefringent cell providing the additive phase retardation contribution to the total phase retardation of the phase retarder) should be allowed to relax to the grey level for which the liquid crystal is most relaxed at the end of the relaxation period, i.e. $\phi_A^f = \phi_{relaxed}$. The generalization of Equation (1) is that π-cell B (the tunable birefringent cell providing the subtractive phase retardation contribution to the total phase retardation of the phase retarder) should be driven to the grey level corresponding to the largest deviation from the relaxed liquid crystal state, i.e. $\phi_B^i = \phi_{max\_drive}$. This yields the generalized initial and final state phase retardation values:

$$\phi_B^i = \phi_{max\_drive}$$

$$\phi_A^f = \phi_{relaxed}$$

$$\phi_A^i = \phi_{max\_drive} + \phi_{target}$$

$$\phi_B^f = \phi_{relaxed} - \phi_{target} \tag{8}$$

where $\phi_{max\_drive}$ is the phase retardation achieved by one tunable birefringent device of the phase retarder when it is maximally driven, and $\phi_{relaxed}$ is the phase retardation achieved by one tunable birefringent device of the phase retarder when it is allowed to fully relax while unbiased (or minimally biased if non-zero minimum bias is employed in the driving scheme). Equation (8) is written assuming that increasing bias reduces the phase retardation, so that $\phi_{relaxed} > \phi_{max\_drive}$, as in the illustrative examples (see FIG. 2). However, this is simply a sign convention, and Equation (8) also applies to a phase retarder in which the constituent tunable birefringent devices are driven to larger phase retardation by increasing bias by the applying the mapping $\phi \leftarrow -\phi$.

The disclosed initial and final phase conditions for the tunable birefringent devices A, B ensure that Equation (3) is satisfied at the initial and final states. However, this does not ensure that Equation (3) is satisfied for all times in the relaxation interval lying between the initial and final states. In general, Equation (3) will not be satisfied for arbitrary time t in the relaxation interval because the two π-cells A, B will have different relaxation times due to the different values for the initial and final phase shifts. This difficulty remains even assuming that the two π-cells A, B have identical relaxation characteristics, and is a consequence of the exponential (or at least non-linear) decay which becomes progressively slower as the liquid crystal state approaches the fully relaxed state (Lv5 in the illustrative example). In the illustrative driving scheme, π-cell A always decays back to Lv5 (see Equation 2). It follows that the relaxation rate of π-cell A is always slower than (or at most equal to) the relaxation rate of π-cell A.

With continuing reference to FIG. 2, to keep the total phase retardation of two π-cells at a constant value which is equal target phase retardation (that is, to ensure Equation (3) is satisfied for all times t in the relaxation interval), the recognition that π-cell A never relaxes faster than π-cell B is leveraged. As diagrammatically indicated in FIG. 2, the relaxation of π-cell B is slowed down to match the relaxation of π-cell A by reducing the voltage on π-cell B gradually; whereas, the voltage on π-cell A is immediately dropped to Lv5 at the end of the transition interval (or equivalently, at the beginning of the relaxation interval). In general, the gradual reduction of voltage is calibrated to slow the relaxation rate of π-cell B to match the relaxation rate of π-cell A at all times over the relaxation interval. In illustrative FIG. 2, the gradual reduction 40 of voltage over π-cell B over the relaxation interval is done in a stepwise fashion, and the size (and optionally the duration) of the steps is empirically calibrated to match the relaxation of π-cell B to that of π-cell A. This calibration is done for each value of the target phase retardation $\phi_{target}$, so that the number of calibrations is equal to the number of gray levels. Given the high reproducibility of commercially available tunable birefringent devices such as commercial π-cells, it is expected that this calibration can be done once for the manufacturing design, possibly with occasional re-calibrations or batch checks.

It should be noted that small errors in the calibration merely affect the achieved grey level slightly, so the calibration does not need to be exact. Thus, for example, in illustrative FIG. 2 the stepwise voltage ramp 40 is calibrated to ensure that Equation (3) is satisfied at four discrete set points 42. One approach for performing the calibration is to use a light meter to measure the light 28 (see FIG. 1) output over the frame, and adjusting the voltage setpoints 42 to match the intensity obtained over the relaxation interval with the intensity obtained in the holding interval.

Moreover, in some embodiments it is contemplated to employ the driving scheme disclosed herein without the voltage-controlled phase relaxation matching aspect. For example, in display applications with high switching speeds (e.g., 24 frames per second or faster), the human eye observes the relaxation time in a time-integrated fashion. Accordingly, in some embodiments the mismatch in relaxation rates between π-cells A, B can be corrected by adjusting the initial and final states $\phi_A^i$, $\phi_B^i$, $\phi_A^f$, $\phi_B^f$ such that the average difference $$\frac{1}{T}\int_i^f \phi_A(t) - \phi_B(t)\,dt = \phi_{target}$$

where T is the relaxation time interval and the integral $\int_i^f \ldots dt$ is over the relaxation interval. If there is also a holding time interval, then $\phi_A^f$, $\phi_B^f$ are constrained to $\phi_A^f - \phi_B^f = \phi_{target}$ and the initial state values $\phi_A^i$, $\phi_B^i$ are adjusted to yield $$\frac{1}{T}\int_i^f \phi_A(t) - \phi_B(t)\,dt = \phi_{target}.$$

The two-cell phase retarder device driving scheme was further investigated using computer simulations. A Frank free energy and Euler-Lagrange equation methodology was used to calculate the director distribution of the π-cells. See Wang et al., J. Opt. Soc. Am. A vol. 22 no. 2 pages 346-354 (2005). The initial condition of the simulated π-cell was in twist state and the liquid crystal π-cell was represented using 201 layers. The cell thickness was 4.95 micron, light wavelength was 633 nm, and the following material parameters were used: $\in_0=8.85\times10^{-12}$ $C^2/Nm^2$; dielectric anisotropy $\Delta\in=7.4$; viscosity $\gamma=0.0397$ Pa·S; $K_{11}=14.4\times10^{-12}$ N; $K_{22}=7.1\times10^{-12}$ N; $K_{33}=19.1\times10^{-12}$ N; ordinary refractive index $n_0=1.50027$; birefringence $\Delta n=0.18633$; pre-tilt angle 4.4°; operation voltage was 0-10 volts. Five retardation levels were chosen for the simulation, along with the corresponding voltages for these five levels. The phase retardation $\phi$ was calculated, of the π-cell from director distribution at different voltages. Then, voltages were applied to set the director distribution of the π-cells to provide the phase retardation for the initial state. Then the cell relaxation process was simulated for cell A with overshoot method to determine the relaxation interval time period. Then, the relaxation process was simulated for cell B in ten equal time length steps, and in each step the voltages 40 to keep the total phase retardation constant was determined.

Experimental tests were also performed. Two π-cells were fabricated with 5 micron spacers filled with liquid crystal (MLC 6080 available from Merck). Transmission intensity of the π-cells was measured at different voltages under crossed and parallel polarizers to acquire voltage versus phase retardation data according to $I_\perp=I_0\sin^2(\phi/2)$ and $I_\parallel=I_0\cos^2(\phi/2)$ where $I_0$ is incident light intensity, $\phi$ is phase retardation, and $I_\perp$ and $I_\parallel$ are transmission intensity under crossed and parallel polarizers, respectively. The rising time was measured from the Lv5 state to the Lv1 state and relaxation time from Lv1 state to Lv5 state with overshoot method to determine the maximum transition time and active time of the device. The value of applied voltage was modified for cell B based on the obtained simulation result to minimize divergence of transmission intensity from desired transmission during relaxation process for different gray level frames.

Figure 3:
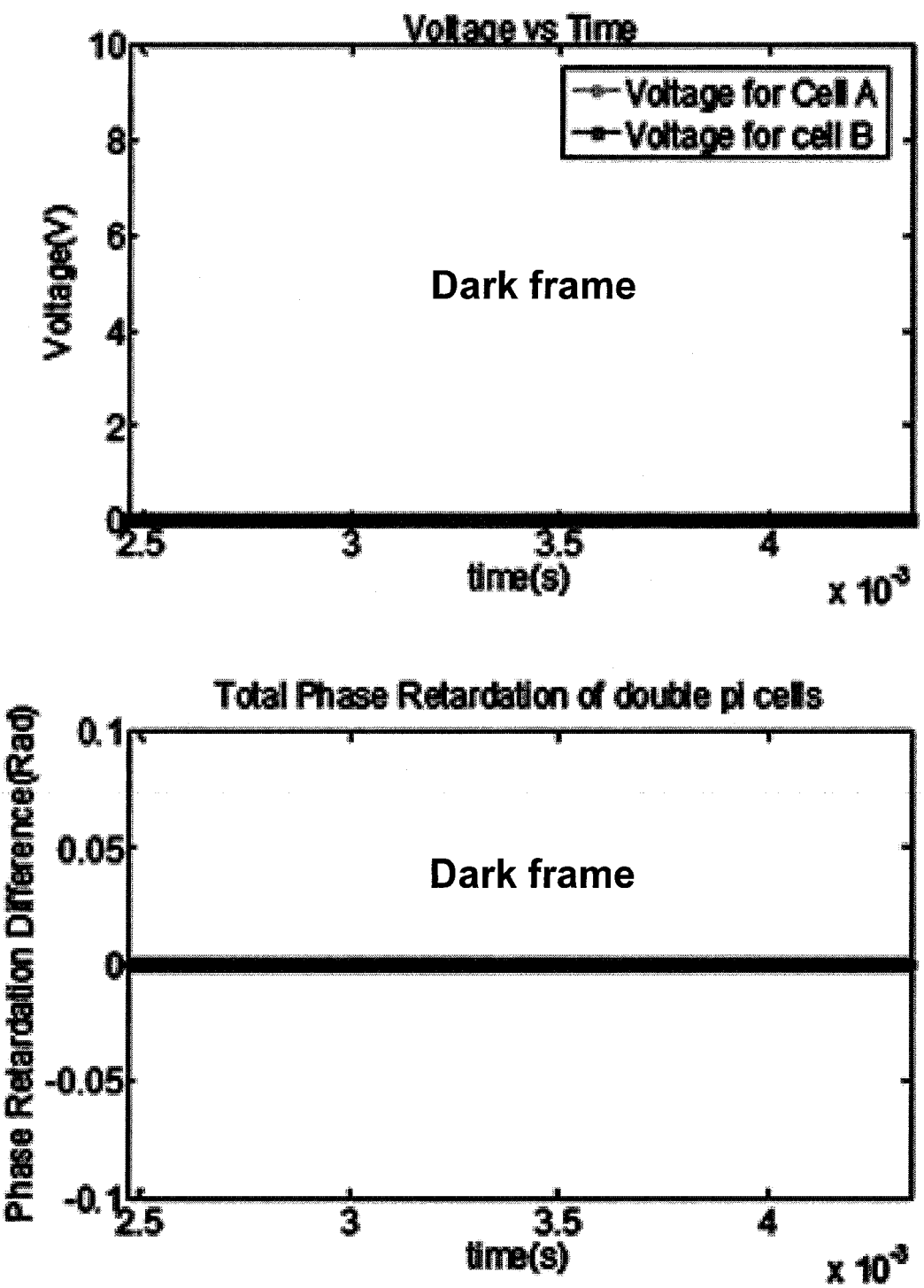
FIGS. 3-7 plot voltage (top graph) and total phase retardation (bottom graph) as a function of time for simulations of double π-cell phase retarder devices with optimized voltage-controlled relaxation matching between the two π-cells of the phase retarder.
Figure 4:
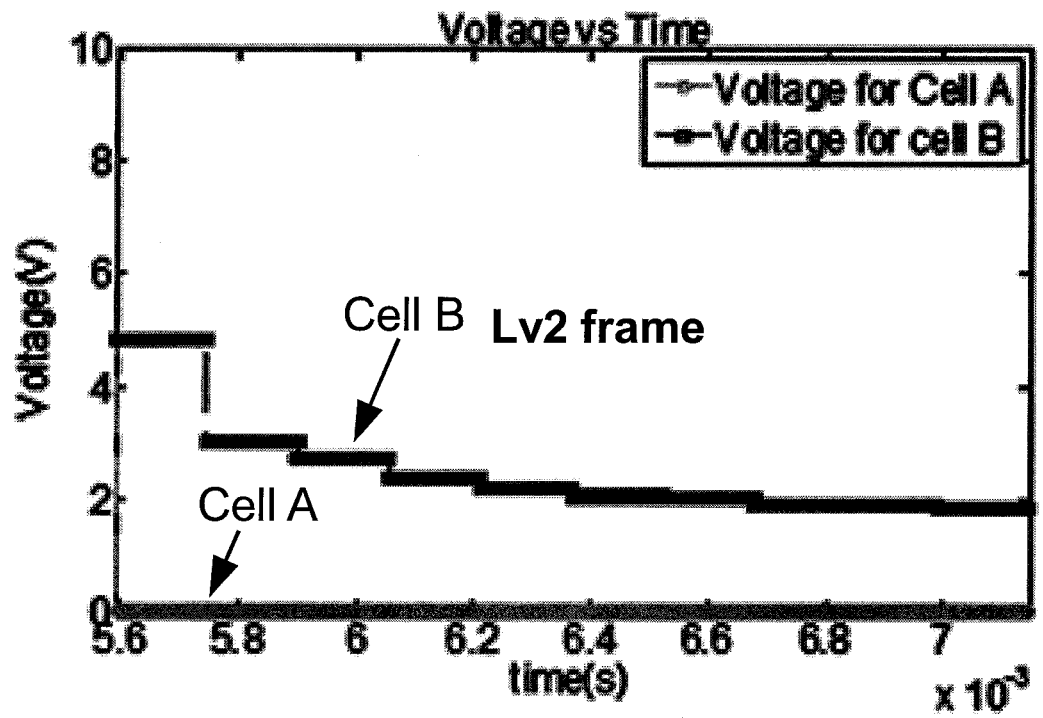
Figure 4:
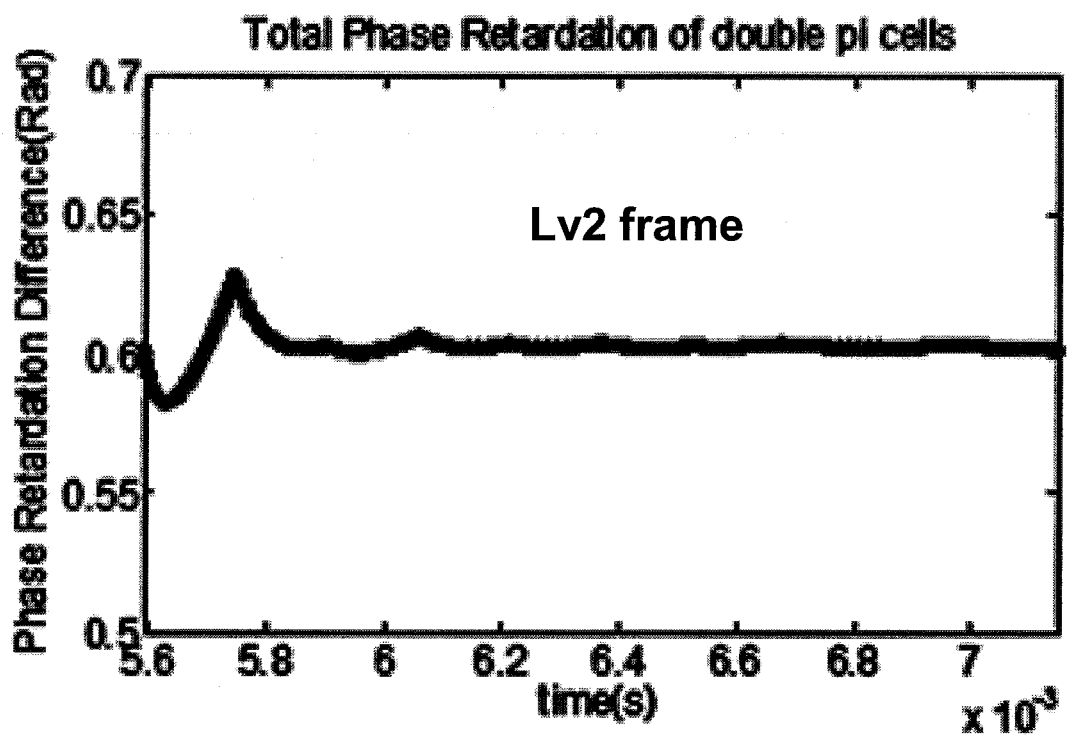
Figure 5:
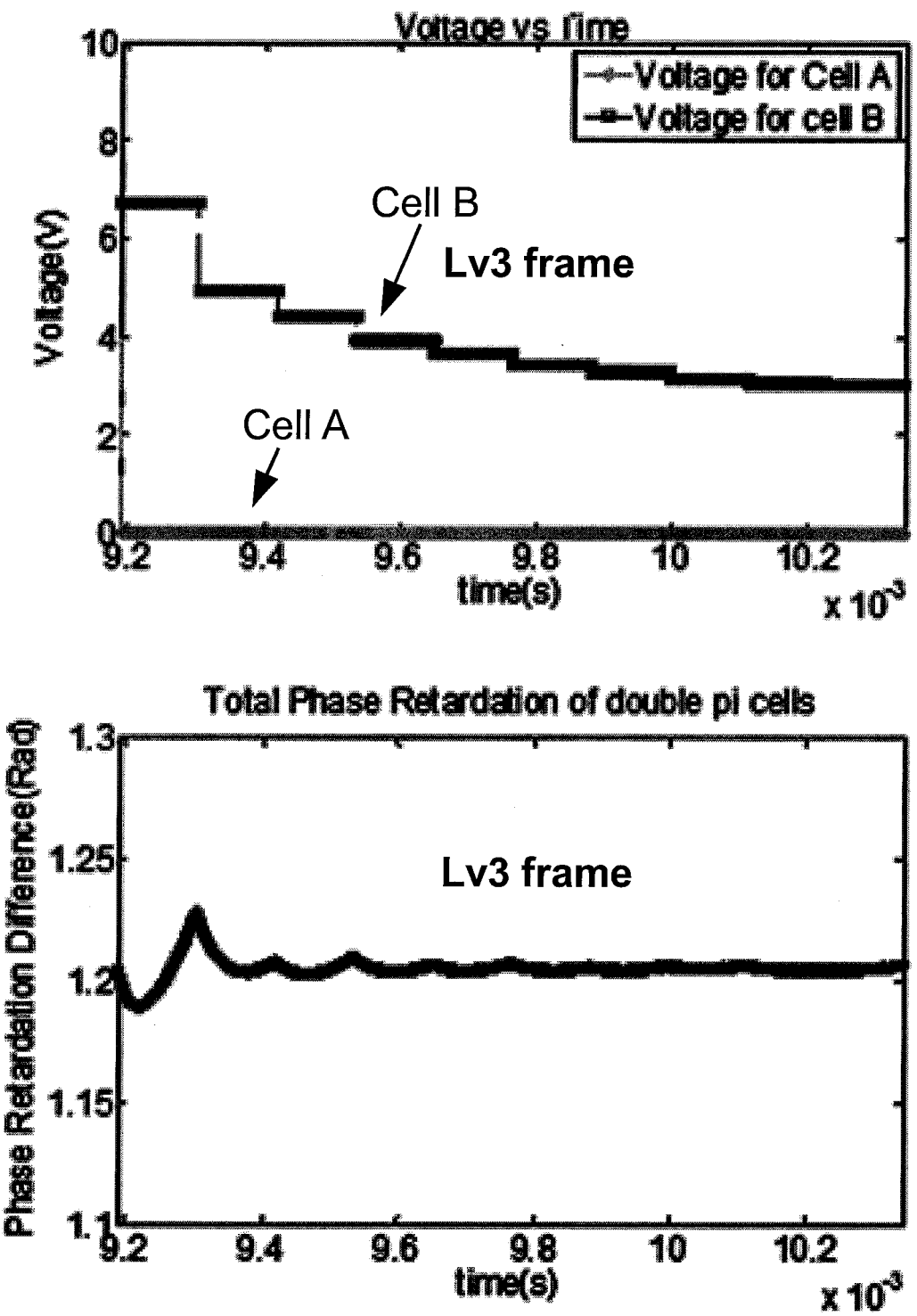
Figure 6:
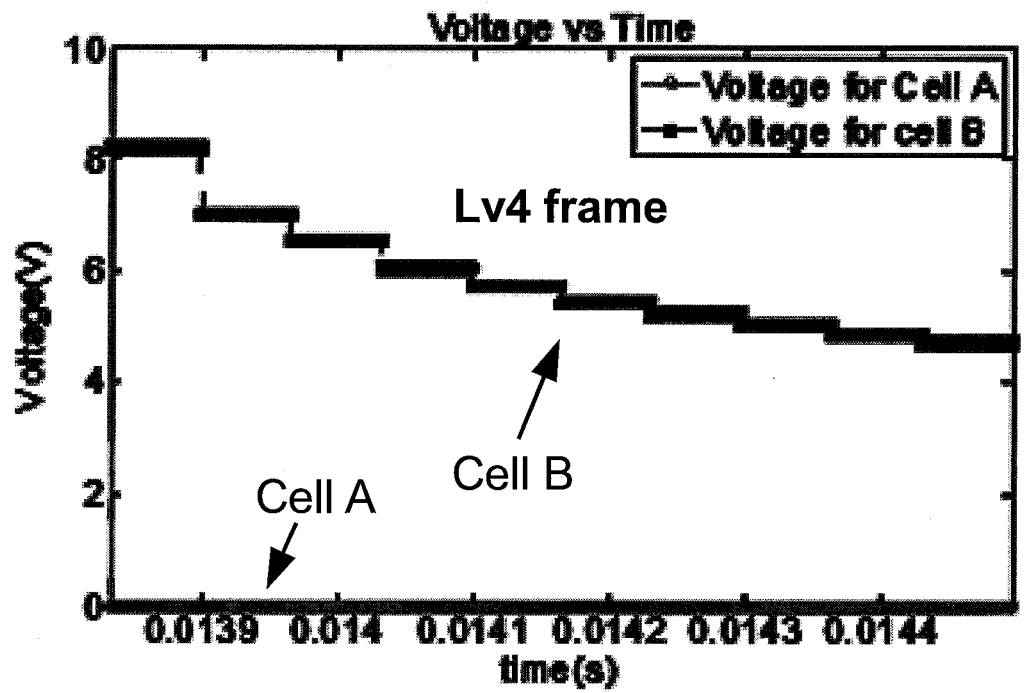
Figure 6:
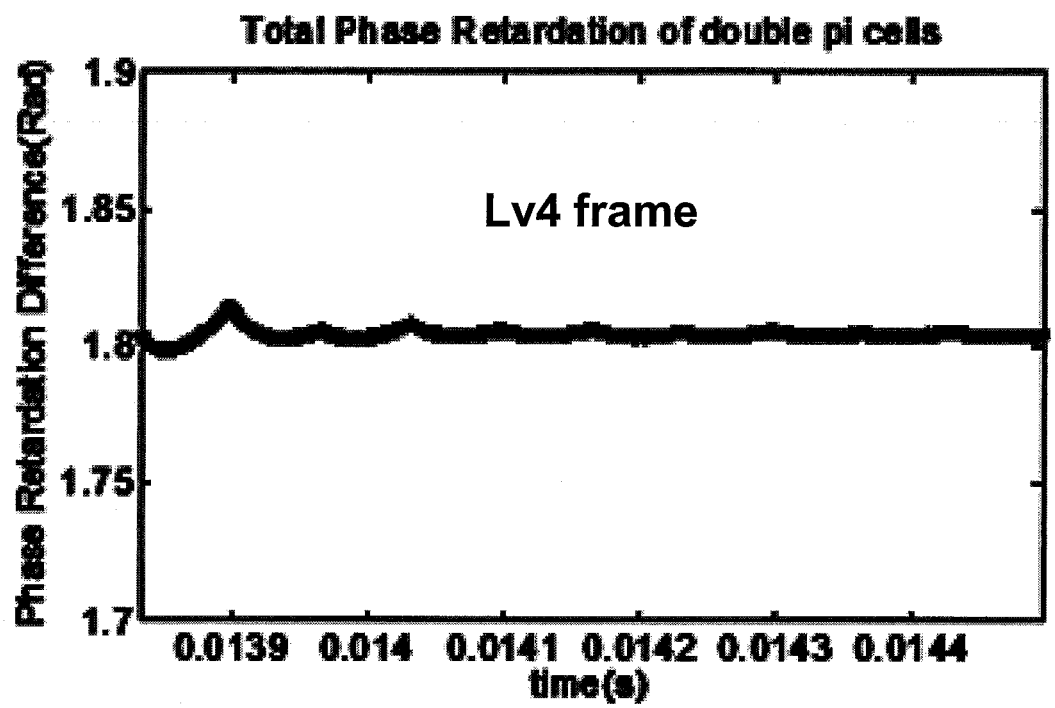
Figure 7:
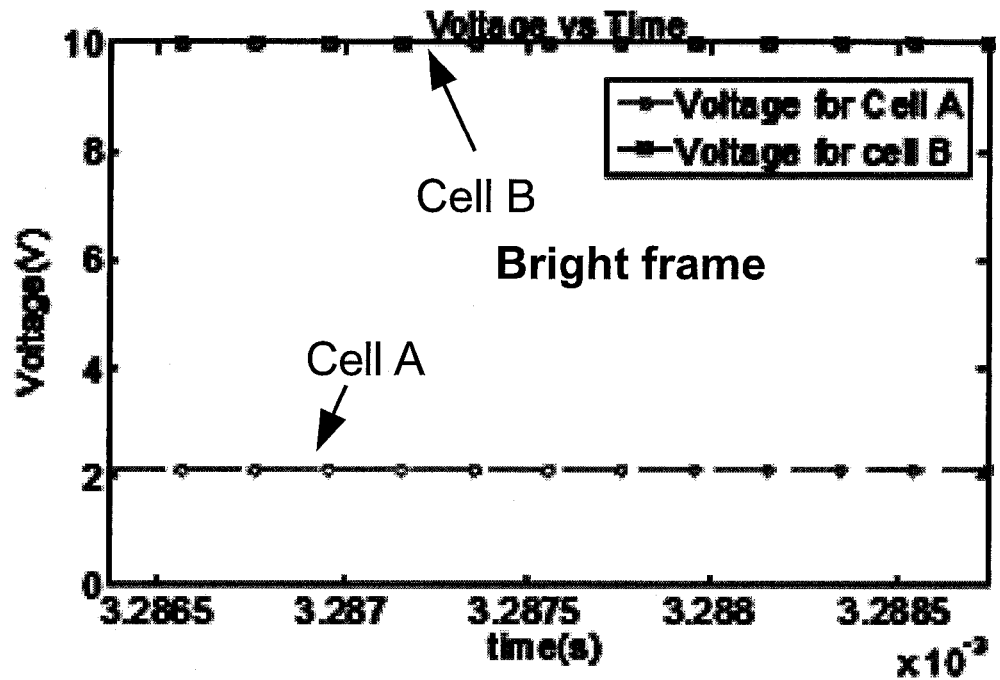
Figure 7:
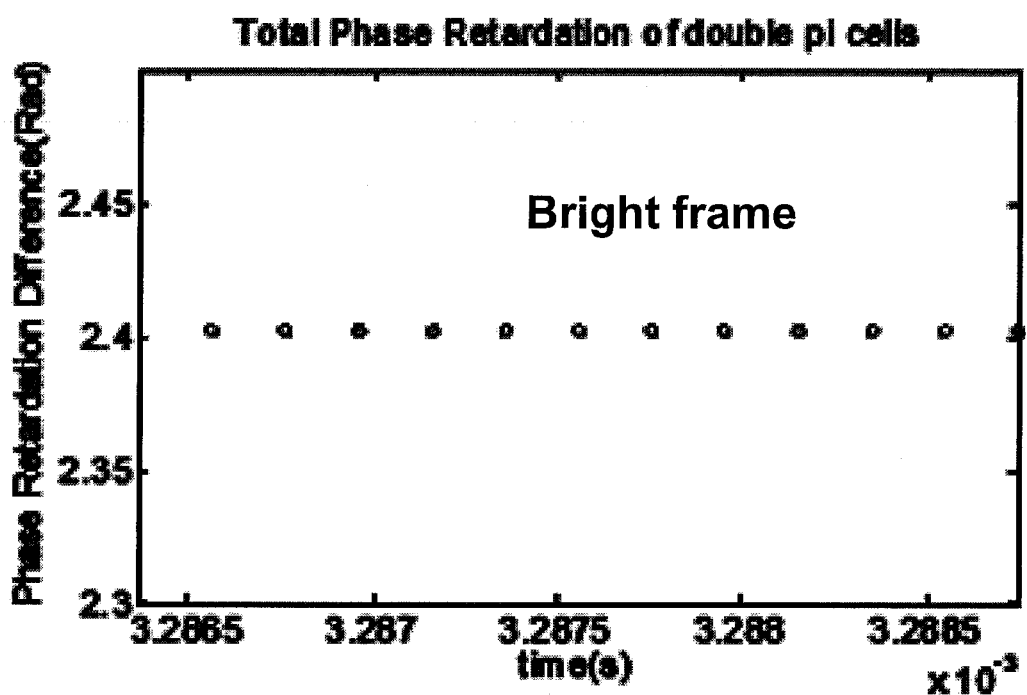

FIGS. 3-7 show the total phase retardation and value of applied voltage for cells A and B during the relaxation process. FIG. 3 is for the dark frame, FIG. 4 is for the Lv2 frame, FIG. 5 is for the Lv3 frame, FIG. 6 is for the Lv4 frame, and FIG. 7 is for the bright frame. The maximum phase retardation for bright state (FIG. 7) could be larger than π for blue light (480 nm). For the case of the variable retarder being used as an optical shutter, it is the variation in transmission that is an issue. The deviation from the desired transmission in an active time interval is quantified by the quantity $$\eta_{error} = \frac{I_{max\_deviation}}{I_{target}} \times 100\%$$

where $I_{max\_deviation}$ is the maximum transmission difference to the target transmission set up for the frame with inserted voltage points to control the relaxation rate of cell B, and $I_{target}$ is transmission set up for this frame.

In simulation results, a significant amount of light leakage was observed for light angles larger than 30 degrees from the cell normal. It has been shown (Mori et al., Jpn. J. Appl. Phys. 1 vol. 38 issue 5A pp. 2837-44 (1999)) that passive optical compensators that are a multi-layer negative C plate with optic axis direction corresponding to the liquid crystal director in the lowest retardation state of the device can be used to reduce this leakage. However in the gray level devices disclosed herein, the optimum value of the compensator chosen is expected to be different for the initial state and final state of the device.

Figure 8:
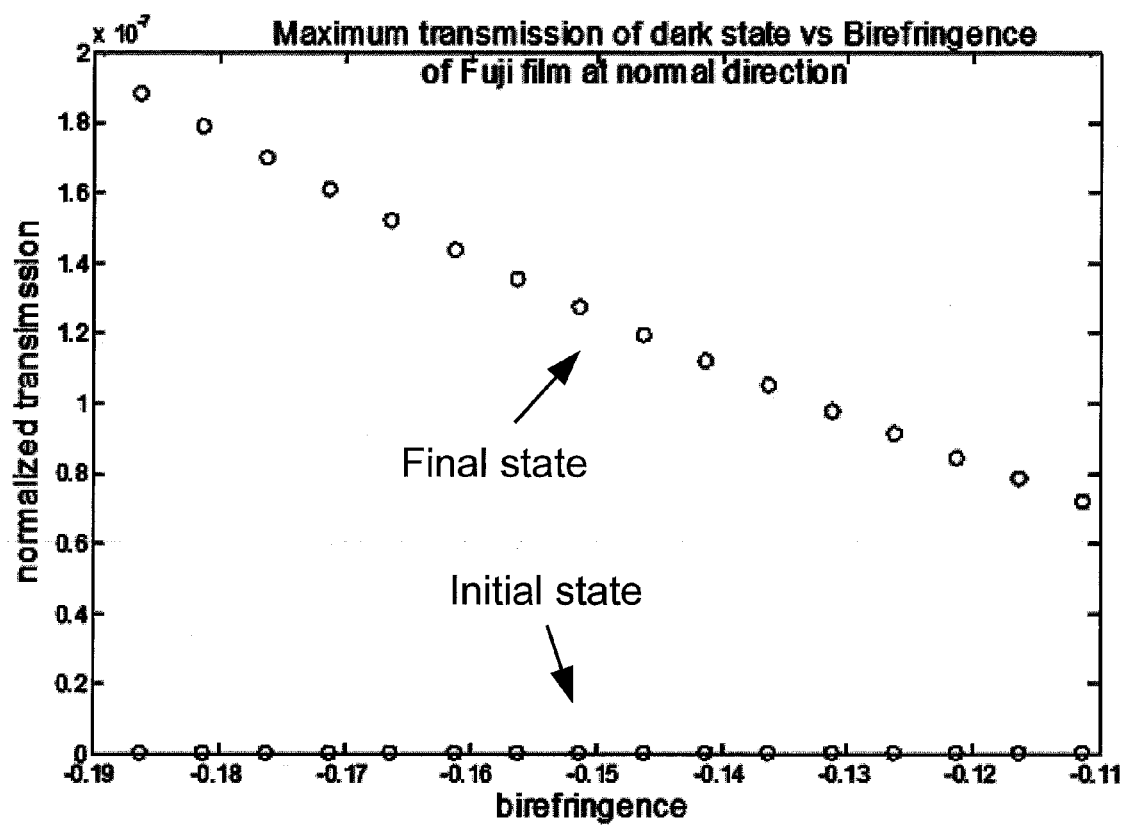
FIGS. 8-10 plot normalized maximum transmission of the dark state frame in the initial state and final state with compensator films as a function of compensator birefringence for on-axis (FIG. 8), within 20° (FIG. 9), and within 45° (FIG. 10) incidence angles.
Figure 9:
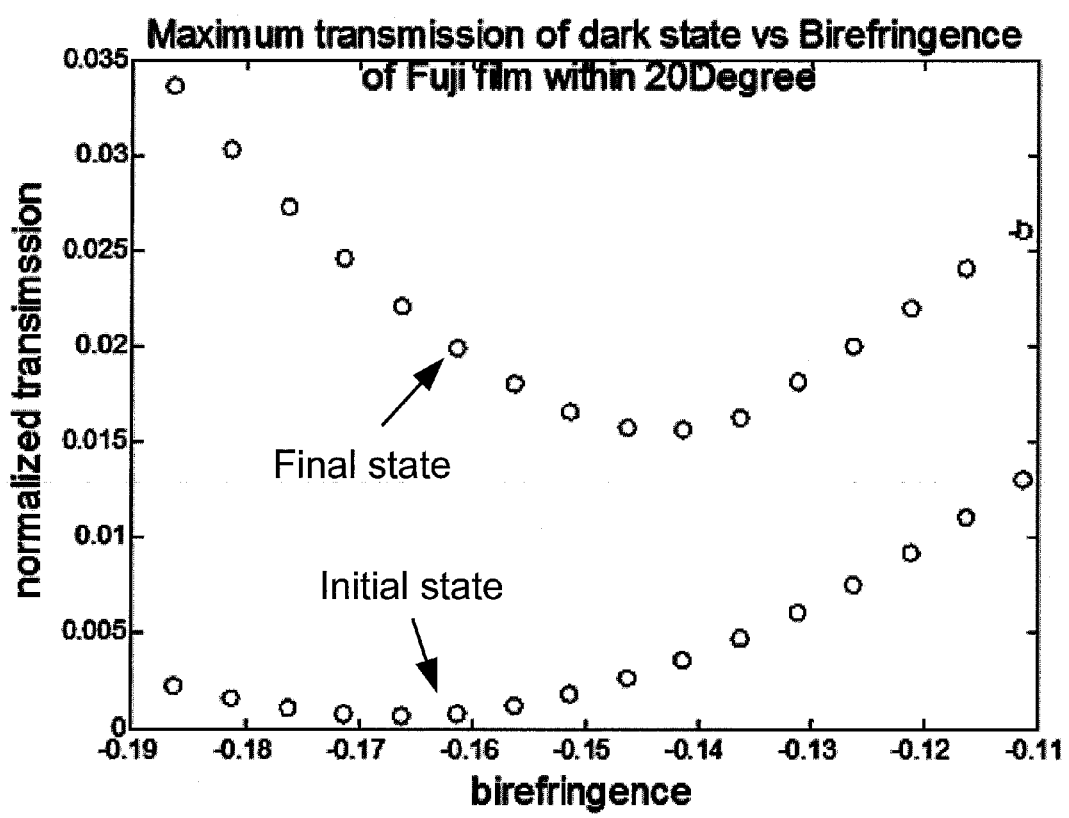
Figure 10:
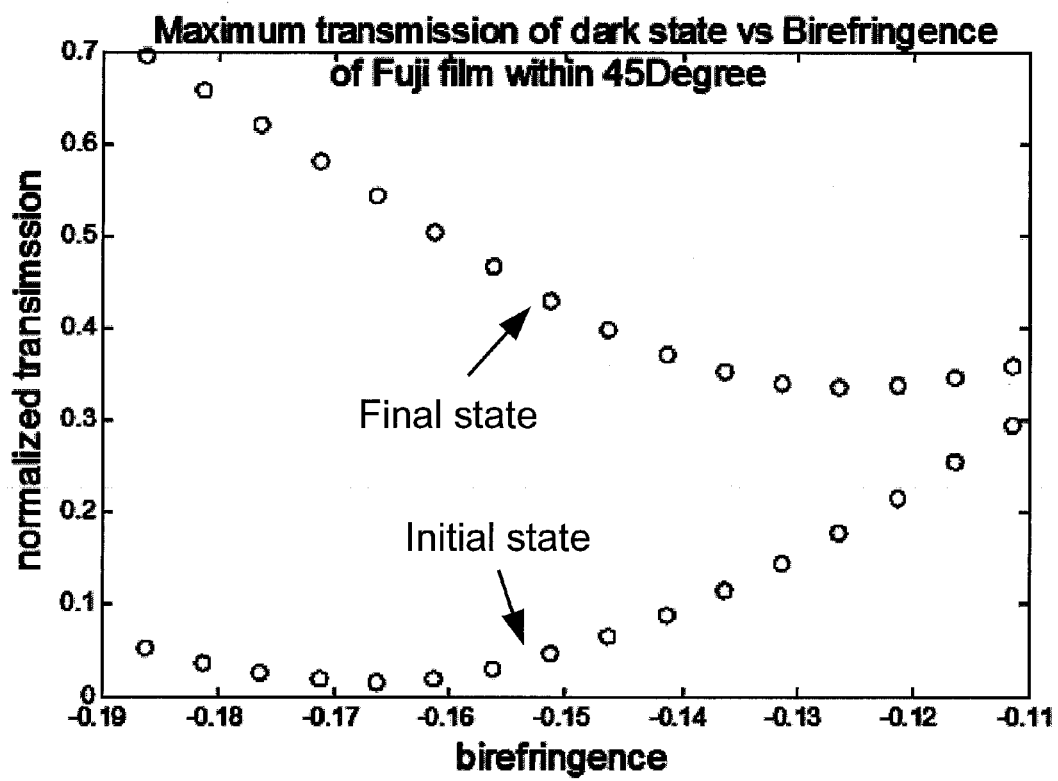

The design of the splayed discotic retarder is conventionally done by considering it have an optic axis distribution to match the director configuration of the liquid crystal cell being compensated when the cell has maximum voltage applied. Further, the magnitude of the birefringence is normally chosen so the product of the birefringence of the compensator times its thickness has the same magnitude as the liquid crystal cell thickness times the birefringence of the liquid crystal material used. However, a different approach is disclosed herein. For illustrative purposes, the thickness of the liquid crystal cell is assumed to be equal to the thickness of the compensator attached. In this case, it would be expected that the magnitude of birefringence of the compensator would be found to be that of the compensated liquid crystal cell. However, as disclosed herein, the best performance is obtained for the overall device when the effective value of the magnitude of the birefringence of the compensator is reduced from that of the liquid crystal material. For example, with reference to FIGS. 8-10 the best performance here was obtained when the magnitude of the birefringence of the compensator film was reduced from the value expected from the literature of 0.186 (the magnitude of the value of the birefringence of the liquid crystal cell) to that of 0.1263 for best results. FIGS. 8-10 plot normalized maximum transmission of the dark state frame in the initial state and final state with the compensator films as a function of compensator birefringence for on-axis (FIG. 8), within 20° (FIG. 9), and within 45° (FIG. 10) incidence angles. It is seen that to have the best dark state within 45°, splayed compensator films with material birefringence equal to −0.1263 can be used because it provides the minimum transmission of the final state, which is the state of greatest leakage. For different detecting angles of the liquid crystal optical retarder for the dark frame at initial state and final state with splayed compensation films which birefringence is −0.1263, the off-axis light leakage was found to be considerably improved over the case of no compensators.

With brief returning reference to FIG. 1, the illustrative pixel 12 is oriented such that π-cell B receives the incident light and π-cell A outputs the transmitted light. However, this order can be reversed, i.e. π-cell A can receive the incident light and π-cell B then outputs the transmitted light. Although not illustrated in FIG. 1, for a color display those pixels providing red light transmission suitably include a red color filter, those pixels providing green light transmission suitably include a green color filter, and those pixels providing blue light transmission suitably include a blue color filter. (The red color filter transmits only the red light component, and analogously for the green and blue color filters). The color filters are optionally integrated with one of the polarizers 24, 26. In another embodiment, a field sequential approach is employed. In this approach there are no color filters associated with the pixels 12; rather, the backlight 22 is configured to emit red light, then green light, then blue light in cyclic fashion (other orderings of red, green, and blue in the emission cycle can be used). In either filter-based color display designs or field sequential color display designs, additional or other spectral components can be included additional to or in place of red, green, and/or blue. For example, it is contemplated to include a fourth component providing dedicated white light, so as to provide enhanced white output quality.

Figure 11:
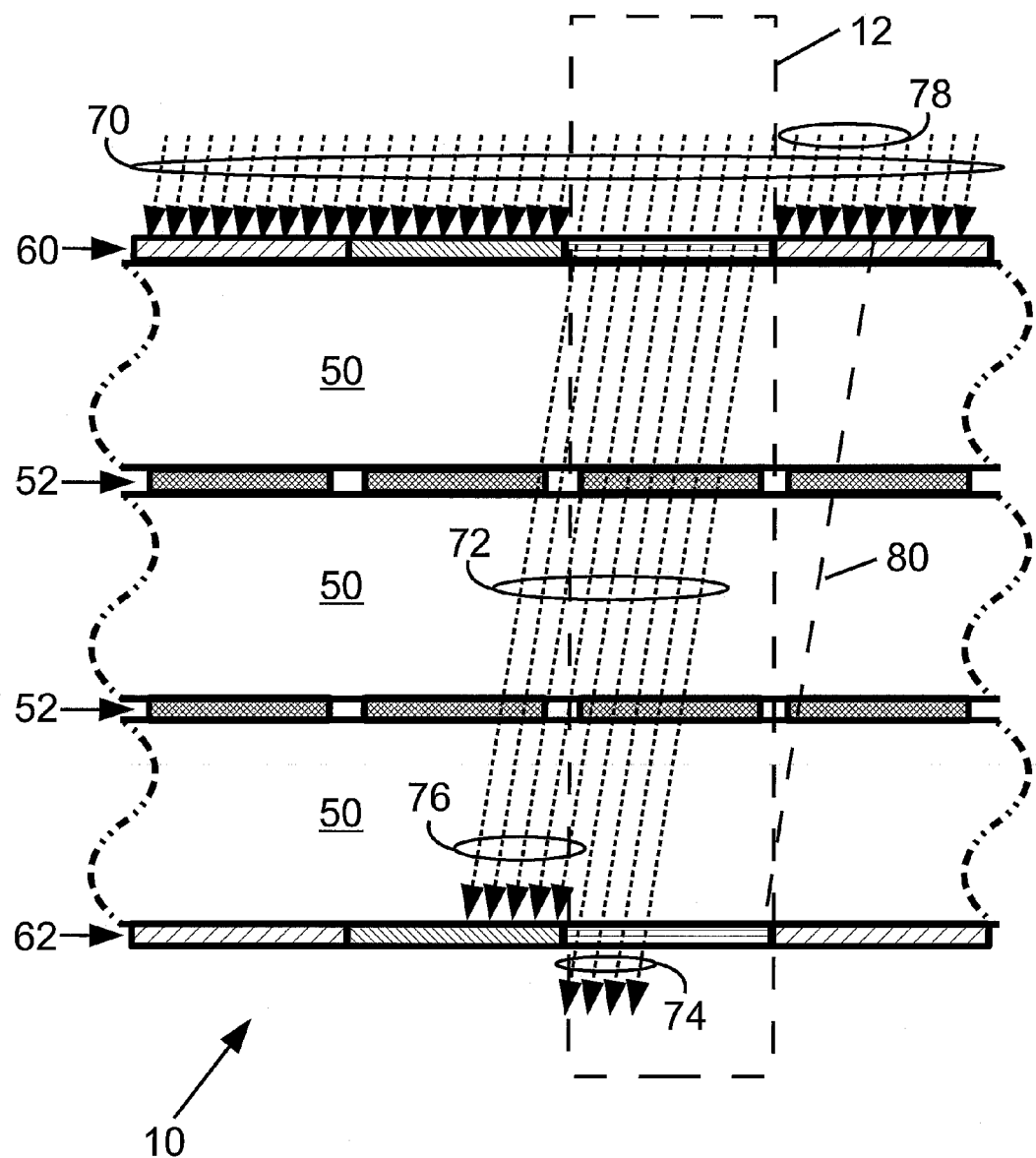
FIG. 11 diagrammatically shows a side view of a color display including color filters arranged to reduce crosstalk and light leakage between adjacent pixels of different colors.

With reference to FIG. 11, a potential difficulty with using the disclosed double π-cell phase retarders as pixels in display applications employing color filters is the large thickness of the double π-cell phase retarder configuration. A typical liquid crystal cell has a gap containing the liquid crystal material of a few microns, bounded by glass substrates having thickness of order 100 microns or greater. FIG. 11 shows a diagrammatic side-sectional view of an embodiment of the pixel array 10 of FIG. 1, with the illustrative pixel identified by a dashed box 12. In this embodiment, the pixel array 10 is constructed using three glass substrates 50 (e.g., each of order 100 microns thickness) defining two cell gaps 52 (e.g., each of order 5 microns). Each cell gap 52 contains the π-cells of one type (e.g. π-cell A or π-cell B). The total structure therefore has a thickness of around 300 microns or larger. (Note that diagrammatic FIG. 11 does not show the driving circuitry, e.g. interconnect wiring, TFT devices, et cetera). A consequence of the large total thickness of the pixel array 10 is that light coming in at a large angle can enter one pixel but exit from an adjacent pixel. This is known as the parallax effect. Conventionally, parallax is addressed by minimizing the overall device thickness, but a sufficiently thin total structure is difficult to achieve in the double π-cell design. Another approach is to include opaque absorbers at the boundaries between pixels, but this reduces total light output and may fail to prevent optical cross-talk at large parallax angles.

With continuing reference to FIG. 11, disclosed herein is a solution to the parallax effect in the case of filter-based transmission displays. In FIG. 11, incident light 70 of the spectral range transmitted by the illustrative pixel 12 is indicated. (In filter-based displays the backlighting is typically white light which includes the spectral component 70 and other spectral components—the other spectral components not shown in FIG. 11). To prevent parallax-induced optical cross-talk, each pixel 12 includes both an entrance color filter 60 disposed on the side of the pixel 12 receiving light from the backlight 22 and an exit color filter 62 having the same transmission spectrum as the entrance color filter 60 (that is, of the same color as the color filter 60) but disposed on the opposite side of the pixel 12 from the entrance color filter 60. (Note that these filters 60, 62 may also embody the polarizers 24, 26 shown in FIG. 1, or alternatively separate polarizers not shown in FIG. 11 may be provided). The use of both entrance and exit color filters 60, 62 might be expected to substantially reduce total light output as compared with using a single color filter for each pixel; however, if the color filters 60, 62 have the same transmission spectrum and high transmissivity in the pass-band (e.g. high transmissivity for red light in the case of red color filters, and so forth) then the reduction in total light output due to the added second color filter is acceptable.

In diagrammatic FIG. 11, different transmission spectra for different-color filters 60, 62, e.g. red, green, or blue, is diagrammatically indicated by different cross-hatching patterns. Neighboring pixels are generally of different colors and have color filters 60, 62 with different transmission spectrums, e.g. red pixels have color filters with pass-bands in the red, and analogously for green and blue pixels.

As diagrammatically shown in FIG. 11, the portion of the light 70 impinging on the entrance filter 60 of pixel 12 passes through the entrance filter 60 as light 72 entering pixel 12. Most of this light 74 passes through the pixel 12 into which it entered, and this light passes out of the pixel 12 (except to the extent it may be attenuated as described herein to provide a gray scale level) and is passed by the exit filter 62 which has the same transmission spectrum as the entrance color filter 60 of the pixel 12.

However, if the light 70 is impinging at a sufficiently large angle, then a portion 76 of this light may pass out of pixel 12 and into a neighboring pixel. Conventionally, this would lead to cross-talk as the light would exit the neighboring pixel. However, the exit filter 62 on the neighboring pixel blocks this light, as diagrammatically shown in FIG. 11, thus preventing the cross-talk that would otherwise result if the exit filter 62 was omitted.

In similar fashion, a light portion 78 of the light 70 would, in the absence of the entrance filters 60, enter from a neighboring pixel and then enter into the pixel 12 and exit the exit filter 62 of the pixel 12. Line 80 shown in FIG. 11 delineates the boundary of the light portion 78. Although this light portion 78 is of the correct color to pass through pixel 12, it is not processed (or is incompletely processed) by the π-cells of the pixel 12, and so again a cross-talk would arise. This potential cross-talk issue is eliminated by the presence of the entrance filters 60.

Thus, it is seen that providing both entrance and exit color filters 60, 62 operates to prevent both types of cross-talk corresponding to the two light portions 76, 78. A single set of color filters (either the entrance filters alone, or the exit filters alone) cannot prevent both types of cross-talk.

It will be appreciated that various of the above-disclosed and other features and functions, or alternatives thereof, may be desirably combined into many other different systems or applications. It will be further appreciated that various presently unforeseen or unanticipated alternatives, modifications, variations or improvements therein may be subsequently made by those skilled in the art which are also intended to be encompassed by the following claims.

The invention claimed is:

1. An apparatus comprising:
a phase retarder comprising a first tunable birefringent device and a second tunable birefringent device arranged optically in series wherein each of the first tunable birefringent device and the second tunable birefringent device has a maximum-bias phase retardation $\phi_{max\_drive}$ at steady state for a maximum bias value and a relaxed phase retardation $\phi_{relaxed}$ at steady state for a minimum bias value; and
driving circuitry configured to drive the phase retarder to generate a target phase retardation $\phi_{target}$ for the phase retarder over the relaxation period of a time frame comprising a transition period followed by a relaxation period by operations including:
(1) biasing the second tunable birefringent device at the maximum bias value during the transition period yielding the maximum-bias phase retardation $\phi_{max\_drive}$ for the second tunable birefringent device at the beginning of the relaxation period,
(2) biasing the first tunable birefringent device during the transition period at a bias value determined based on the target phase retardation $\phi_{target}$,
(3) biasing the first tunable birefringent device at the minimum bias value during the relaxation period yielding the relaxed phase retardation $\phi_{relaxed}$ for the first tunable birefringent device at the end of the relaxation period, and
(4) biasing the second tunable birefringent device during the relaxation period at a bias value determined based on the target phase retardation $\phi_{target}$, wherein the driving circuitry is configured to perform the biasing operations (2) and (4) at bias values between the minimum bias value and the maximum bias value.

2. The apparatus of claim 1 wherein the minimum bias value is zero volts.

3. The apparatus of claim 1 wherein the first tunable birefringent device is a first π-cell and the second tunable birefringent device is a second π-cell having its rubbing directions oriented tranverse to the rubbing directions of the first π-cell.

4. The apparatus of claim 1 wherein:
the first tunable birefringent device is a first π-cell and the second tunable birefringent device is a second π-cell having its rubbing directions oriented tranverse to the rubbing directions of the first π-cell;
the first π-cell provides an additive phase retardation contribution to the total phase retardation of the phase retarder;
the second π-cell provides a subtractive phase retardation contribution to the total phase retardation of the phase retarder; and
the biasing operations (1), (2), (3), and (4) respectively comprise:
(1) biasing the second π-cell at the maximum bias value during the transition period yielding the maximum-bias phase retardation $\phi_{max\_drive}$ for the second π-cell at the beginning of the relaxation period,
(2) biasing the first π-cell during the transition period at a bias value yielding phase retardation $\phi_{max\_drive} + \phi_{target}$ for the first π-cell at the beginning of the relaxation period;
(3) biasing the first π-cell at the minimum bias value during the relaxation period yielding the relaxed phase retardation $\phi_{relaxed}$ for the first π-cell at the end of the relaxation period, and
(4) biasing the second π-cell during the relaxation period at a bias value yielding phase retardation $\phi_{relaxed} - \phi_{target}$ for the second π-cell at the end of the relaxation period.

5. The apparatus of claim 4 wherein the biasing operation (4) comprises reducing the bias of the second π-cell continuously or in multiple voltage decrease steps over the relaxation period from the maximum bias value at the beginning of the relaxation period to the bias value yielding phase retardation $\phi_{relaxed} - \phi_{target}$ at the end of the relaxation period.

6. The apparatus of claim 5 wherein reducing of the bias of the second n-cell continuously or in multiple voltage decrease steps over the relaxation period is configured to maintain the total phase retardation of the phase retarder at the target phase retardation $\phi_{target}$ throughout the relaxation period.

7. The apparatus of claim 1 wherein the biasing operations (2) and (4) are configured to yield $$\frac{1}{T}\int_{i}^{f} \phi_A(t) - \phi_B(t) dt = \phi_{target}$$

where T is the duration of the relaxation period, the integral $\int_i^f \ldots dt$ is over the relaxation period, $\phi_A(t)$ is the phase retardation of the first tunable birefringent device over the relaxation period, and $\phi_B(t)$ is the phase retardation of the second tunable birefringent device over the relaxation period.

8. The apparatus of claim 1 wherein the biasing operation (4) is configured to maintain $\phi_A(t) - \phi_B(t) = \phi_{target}$ throughout the relaxation period where t denotes time, $\phi_A(t)$ is the phase retardation of the first tunable birefringent device over the relaxation period, and $\phi_B(t)$ is the phase retardation of the second tunable birefringent device over the relaxation period.

9. The apparatus of claim 1 wherein the biasing operation (4) comprises reducing the bias of the second tunable birefringent device from the maximum bias value at the beginning of the relaxation period to a bias value yielding phase retardation $\phi_{relaxed}-\phi_{target}$ for the second tunable birefringent device at the end of the relaxation period.

10. The apparatus of claim 9 wherein the biasing operation (4) reduces the bias of the second tunable birefringent device continuously or in multiple voltage decrease steps over the relaxation period.

11. The apparatus of claim 10 wherein the biasing operation (4) reduces the bias of the second tunable birefringent device continuously or in multiple voltage decrease steps over the relaxation period to maintain the total phase retardation of the phase retarder at $\phi_A(t)-\phi_B(t)=\phi_{target}$ over the relaxation period where t denotes time, $\phi_A(t)$ is the phase retardation of the first tunable birefringent device over the relaxation period, and $\phi_B(t)$ is the phase retardation of the second tunable birefringent device over the relaxation period.

12. The apparatus of claim 1 further comprising:
a first polarizer and a second polarizer disposed on opposite sides of the phase retarder.

13. A display comprising an array of pixels wherein each pixel includes:
the apparatus of claim 1;
polarizers disposed on both sides of the phase retarder of the apparatus of claim 1; and
color filters disposed on both sides of the phase retarder of the apparatus of claim 1.

14. A display device comprising:
an array of light-transmissive pixels; and
a backlight illuminating the array of light-transmissive pixels;
wherein each light-transmissive pixel includes:
a light-transmissive optical element comprising a liquid crystal material,
an entrance color filter disposed on the side of the light-transmissive optical element receiving light from the backlight; and
an exit color filter of the same color as the entrance color filter disposed on the opposite side of the light-transmissive optical element from the entrance color filter.

15. The display device of claim 14 wherein the entrance and exit color filters of neighboring pixels of the array of light-transmissive pixels are of different colors.

16. The display device of claim 14 wherein the light-transmissive optical element comprises:
a phase retarder including a first tunable birefringent device and a second tunable birefringent device arranged optically in series; and
driving circuitry configured to drive the phase retarder to generate at least three different gray scale levels.

17. An apparatus comprising:
a phase retarder comprising a first tunable birefringent device and a second tunable birefringent device arranged optically in series wherein the phase retardation value of the phase retarder is a difference between the phase retardation value of the first birefringent device and the phase retardation value of the second tunable birefringent device; and
driving circuitry configured to drive the phase retarder to generate a target phase retardation value by operations including:
(1) prior to a relaxation period, biasing the first and second tunable birefringent devices to produce the target phase retardation value for the phase retarder,
(2) during the relaxation period, biasing the first tunable birefringent device at a constant bias value, and
(3) during the relaxation period, lowering the bias value of the second tunable birefringent device continuously or stepwise to maintain the target phase retardation value for the phase retarder throughout the relaxation period.

18. The apparatus of claim 17 wherein the operation (2) comprises applying zero bias to the first tunable birefringent device throughout the relaxation period.

19. The apparatus of claim 18 wherein the operation (1) comprises applying a maximum operational bias to the second tunable birefringent device.

20. The apparatus of claim 17 wherein the first tunable birefringent device comprises a first π-cell and the second tunable birefringent device comprises a second π-cell.

* * * * *